US011568253B2

(12) United States Patent
Hazra et al.

(10) Patent No.: US 11,568,253 B2
(45) Date of Patent: Jan. 31, 2023

(54) FALLBACK ARTIFICIAL INTELLIGENCE SYSTEM FOR REDUNDANCY DURING SYSTEM FAILOVER

(71) Applicant: PAYPAL, INC., San Jose, CA (US)

(72) Inventors: Joydeep Hazra, Bangalore (IN); Harshith Thonupunoori, Warangal (IN); Md Faiz Alam, Bangalore (IN); Rajendra Bhat, Bangalore (IN); Santosh Bharamasagar Chandrasekharappa, Bangalore (IN); Sourav Kumar, Bihar (IN); Vijayent Kohli, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 186 days.

(21) Appl. No.: 16/990,770

(22) Filed: Aug. 11, 2020

(65) Prior Publication Data

US 2022/0050751 A1 Feb. 17, 2022

(51) Int. Cl.
*G06N 3/08* (2006.01)
*G06F 11/14* (2006.01)
*G06Q 20/40* (2012.01)

(52) U.S. Cl.
CPC ........... *G06N 3/08* (2013.01); *G06F 11/1476* (2013.01); *G06F 11/1482* (2013.01); *G06F 2201/805* (2013.01); *G06Q 20/4016* (2013.01)

(58) Field of Classification Search
CPC ............ G06F 11/1476; G06F 11/1482; G06F 11/1492; G06F 11/1675; G06F 11/1683; G06F 11/1687; G06F 11/2028; G06F 11/203; G06F 2201/805; G06N 3/02; G06N 3/0427; G06N 3/08; G06N 20/00; G06Q 20/4016; G06Q 20/405
See application file for complete search history.

(56) References Cited

U.S. PATENT DOCUMENTS

| 6,067,535 | A  | * | 5/2000  | Hobson  | G06Q 30/02 706/16 |
|---|---|---|---|---|---|
| 9,336,483 | B1 | * | 5/2016  | Abeysooriya | G06N 3/08 |
| 2019/0385170 | A1 | * | 12/2019 | Arrabothu | G06N 7/005 |
| 2019/0391891 | A1 | * | 12/2019 | Gupta | G06F 11/2263 |
| 2021/0117868 | A1 | * | 4/2021  | Sriharsha | G06F 16/901 |
| 2021/0224648 | A1 | * | 7/2021  | Zhuang | G06N 3/0454 |

(Continued)

*Primary Examiner* — Bryce P Bonzo
*Assistant Examiner* — Albert Li
(74) *Attorney, Agent, or Firm* — Haynes and Boone, LLP

(57) ABSTRACT

There are provided systems and methods for a fallback artificial intelligence (AI) system for redundancy during system failover. A service provider may provide AI systems for automated decision-making, such as for risk analysis, marketing, and the like. An AI system may operate in a production computing environment in order to provide AI decision-making based on input data, for example, by providing an output decision. In order to provide redundancy to the production AI system, the service provider may train a fallback AI system using the input/output data pairs from the production AI system. This may utilize a deep neural network and a continual learning trainer. Thereafter, when a failover condition is detected for the production AI system, the service provider may switch from the production AI system to the fallback AI system, which may provide decision-making operations during failure of within the production computing environment.

20 Claims, 5 Drawing Sheets

(56) References Cited

U.S. PATENT DOCUMENTS

2021/0342847 A1* 11/2021 Shachar ............. G06Q 20/4016
2021/0350277 A1* 11/2021 Agrawal ................. G06N 3/04
2021/0406369 A1* 12/2021 Healy ................... G06F 21/562

* cited by examiner

US 11,568,253 B2

FALLBACK ARTIFICIAL INTELLIGENCE SYSTEM FOR REDUNDANCY DURING SYSTEM FAILOVER

TECHNICAL FIELD

The present application generally relates to training artificial intelligence (AI) models based on past AI decision-making operations and more particularly to a fallback system that provides redundancy to production AI systems when a failover condition occurs.

BACKGROUND

Service providers may provide artificial intelligence (AI) systems and AI models trained over time to provide automated decision-making operations. For example, a particular AI platform may be associated with providing decision-making operations within a production computing environment including live electronic transaction processing operations. As AI systems are used over time, the AI systems may become more accurate in making predictions and recommendations or automating operations based on the input data. For example, a machine learning (ML) and/or neural network system may retrain weights, attributes, and classifiers as the model becomes more sophisticated and has a larger amount of training data. However, at times during use in the production computing environment, AI systems may fail or timeout. This may occur when new data occurs, fraud or computing attacks compromise the computing systems, or other failover conditions occur. When the AI system is down, the AI system may not provide decision-making, which may adversely affect the production computing environment and operations. For example, the production computing environment may make incorrect decisions or outputs that allows fraud and risk, or may not process user requests. Thus, the service provider may be adversely affected by system errors and failures.

Figure 1:
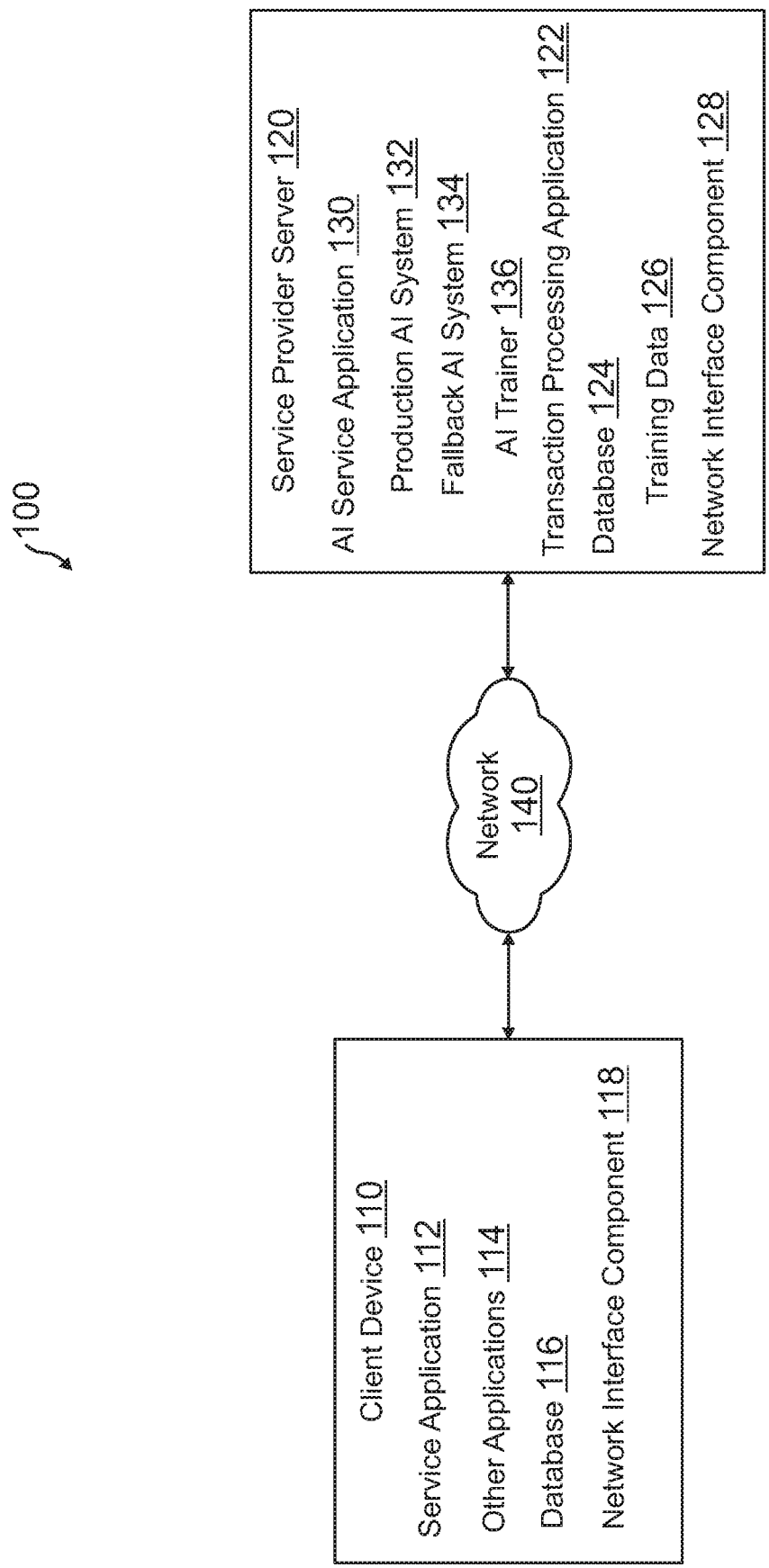
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a fallback artificial intelligence (AI) system for redundancy during system failover. Systems suitable for practicing methods of the present disclosure are also provided.

A service provider may provide a fallback artificial intelligence (AI) system that provides AI decision-making operations when a primary AI system fails, such as a failover of a production AI system in a production computing environment. In this regard, the service provider may allow for training and/or retraining of the fallback AI model with the fallback AI system based on input data and output decisions by the primary AI system and service. For example, one or more AI models of the primary AI system may initially be trained using training data through a supervised or unsupervised machine learning or neural network algorithm and technique. The primary AI system may then, over time, make decisions in the production computing environment based on the trained AI model. A simulated AI model may be generated by the service provider based on monitoring the interactions and decisions of the primary AI system, including inputs to the primary AI system and outputs of the AI system based on the inputs.

Thereafter, the simulated AI model may be trained as a fallback AI system for the primary AI system in the production computing environment. Thus, when a failure occurs with the production computing environment, the primary AI system, or another system that affects the use of the primary AI system, the service provider may transition from the primary AI system during the failure condition to the fallback AI system. This then enables AI decision-making to continue when the failover condition occurs so that the production computing environment and operations may receive the benefits of the AI decision-making systems. Failovers or failures, as used herein, may be defined in different embodiments as any condition that results in the production computing environment not being able to process transactions at all or not being able to process transactions within certain thresholds, such as accuracy and/or time.

In this regard, a service provider, which may provide services to users including electronic transaction processing such as online transaction processors (e.g., PayPal®), may allow merchants, users, and other entities to establish an account to integrate and utilize computing services that include AI models and systems. A user may interact with the service provider to establish an account and provide other information for the user (e.g., consumer, merchant, service provider, or other entity). In order to utilize the computing services of a service provider, the account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. The service provider may also provide other computing services, including electronic transaction processing, social networking, microblogging, media sharing, messaging, business and consumer platforms, etc. Thereafter, the user may utilize their account with the computing services of the service provider, including AI functionalities, such as risk assessment for electronic transaction processing, account access and/or authentication, marketing and advertising, search services and engines, recommendation services, chatbot communications, and the like.

In large service provider data systems, AI systems, models, and platforms may be exposed to large amounts of training data and may have access to sufficiently large data sets that allows for an AI model to be trained, including training for a particular user or group of users and/or for a particular use, project, requirement, or operation. This allows for initial training of a primary or production AI system for decision-making within a production computing environment that provides live data processing and AI decision-making. The service provider may thither monitor different primary or production AI systems so that communications, data, and user interactions with these primary AI systems may be monitored. This may include monitoring the context data that is input into the primary AI system.

For example, the service provider may utilize an AI trainer to monitor user interactions with one or more AI platforms, which includes input context data (e.g., a user request, transaction data, account data, device data, user data, account/user actions, etc.) and corresponding output data (e.g., decisions, predictions, classifications, scores, ratings, or other output by the AI system). This may include monitoring user inputs, such as text data, media data, operational data, a search request, a data query, or other context data that a user requests to be processed by an AI platform to provide an AI output. Further, the service provider may monitor outputs by the AI platform based on these inputs, including a risk analysis, determining an advertisement or marketing strategy, providing a recommendation, providing a search result, responding through an automated chat option, or other AI output. Thus, the service provider may determine predictions, recommendations, or automated output by the AI platform.

The service provider may then utilize the data to train a backup or fallback AI model based on the inputs, outputs, or other training data to provide AI functionalities that are associated with the primary or production AI system. Prior to training the fallback AI model, the service provider may perform feature extraction on the input data, which includes determining the input features used to train an AI model to perform backup decision-making for a primary AI system. Feature extraction or feature engineering may be performed on the input context data to determine features from the context data. Thereafter, utilizing the monitored data, the service provider may then build one or more simulated AI models for the primary AI models based on the monitored input/output data pairs, extracted features, classifiers, and the like. For example, a primary AI system may correspond to a risk analysis system, a marketing recommender, an automated chatbot, a search function, a natural language processor, an image recognition operation, an autonomous device operation, and/or other AI functionalities. The service provider may utilize the inputs as the training data to train a fallback AI model for a fallback AI system that provides the same or similar outputs as the primary AI model that provided the initial recommendation or prediction based on the user's input. For example, the service provider may utilize the past behavior and user interactions (e.g., the past inputs/outputs) of the primary AI model to generate a fallback AI model using the extracted features mapped to the fallback AI model's classifiers, recommendations, predictions, or other output.

In some embodiments, a machine learning (ML), neural network (NN), or other AI algorithms and operations may be used with the training data (e.g., inputs and corresponding features with outputs and corresponding decisions or classifiers). For example, a deep learning technique for an NN, such as a continual learning neural network, may be used to train the fallback AI model. The fallback AI model may be trained through unsupervised training or learning where human interaction, data annotation, and/or intervention is not utilized. However, in other embodiments, supervised training may also be used, which may include light supervised training where an administrator, system engineer, developer, or the like may provide annotated data and/or annotating or flagging correct and incorrect decision-making. In some embodiments, the service provider may also use the same or similar weights and attributes from the input training data to generate the same or similar fallback AI model. However, the service provider may utilize other AI algorithms (e.g., supervised or unsupervised ML algorithms, NN algorithms, and the like) to determining weights, attributes, classifiers, and/or output recommendations and predictions to train the fallback AI model. Further, the service provider may use continual learning to build the model based on additional monitored context data and correspondingly mapped output data (e.g., the inputs and outputs, as well as the classifiers and/or recommendations).

When training the fallback AI model, the service provider may utilize the input context data and feature engineering from the context data as training data. Additionally, the service provider may provide the outputs based on the input context data as the corresponding outputs that are mapped to the input context data, and therefore correspond to the trained classifiers and outputs. The service provider may determine the classifiers and recommendations/predictions for the fallback AI system based on the algorithms and techniques for the NN in order to provide decision-making operations with an accuracy that meets or exceeds a threshold decision-making accuracy. For example, for redundancy during the failover condition or state, the service provider may previously use coded rules based on business practices or rules, which may provide a 70% accuracy of the primary production AI system. In order to utilize the fallback AI model and corresponding system, the fallback AI model may be required to meet or exceed the 70% accuracy of decision-making, which may increase or change over time based on the continual learning NN and training operations.

Once the fallback AI model has been trained and the fallback AI system has been provisioned as a backup to the primary AI system, the service provider may detect a failover condition or state that causes a failure of the primary AI system. This causes a failover to the fallback AI system by the production computing environment and operations during the failure of the primary AI model, for example, by switching to the fallback AI system. The fallback AI system may be built using the same or similar application programming interfaces (APIs) of the primary AI system so that the same or similar API contract for the primary AI model with the client device (e.g., the API contract for the APIs interfacing between the production computing environment and the client device) may be used to provide decision-making and operations of the fallback AI system. This allows for the fallback AI system to quickly communicate with and process data from the client device requesting the data processing operations in the production computing environment.

In order to limit risk using the fallback AI system, the service provider may further provide a policy layer having one or more policy rules and/or limits on use of the fallback AI model and system for decision-making when the primary AI system is offline or in a failure state. For example, the policy rules may be associated with a maximum limit on electronic transaction processing allowance based on risk assessments. The policies may also allow only a certain number of transactions to be processed by an entity, or otherwise limit certain aspects of risk and fraud compliance in order to prevent abuse of the production computing environment and operations when using the fallback AI system, which may not include as many or robust decision-making capabilities. The policy layer may be a light layer that provides minimal rules and limits on use of the fallback AI system, for example, where the fallback AI system is highly trained and/or reliable in decision-making (e.g., over a certain percentage threshold of similar decision-making to the primary AI system). However, more restrictive rules and limits may also be imposed on the fallback AI system where necessary, for example, based on potential fraud of the system, amount of training of the fallback AI system, and the like The fallback AI system may therefore be used as a fallback AI system for a risk analysis AI system, a marketplace recommendation AI system, an advertisement AI system, a search engine AI system, an automated chatbot AI system, or the like. In addition to acting as a backup to the primary AI system, the monitoring of the primary AI system's data and decision-making may also be used to build simulated AI services as a microservice and/or test microservices that utilize AI decision-making. For example, data may be used to build and/or test a microservice that utilizes one or more AI (e.g., ML or NN) models. The input/output pairs from the production AI model and system may be used as the input and corresponding correct answer, classification, or recommendation. Thus, the data may be used as training data that can generate and automatically test microservices for performing the same or similar decision-making as the production system. This allows for generation of secondary services that perform the AI operations corresponding to the production computing environment.

Thereafter, when the primary AI system comes back online after failure, the service provider may switch back to the primary AI system from the fallback AI system. This may be performed through the API contract used to determine APIs to negotiate communications with the client device. Thus, the primary AI system may further be used to provide decision-making operations and outputs based on input context data. The fallback AI model for the fallback AI system may further be continuously trained using additional and new context data and output decisions by the primary AI system. The fallback AI system may then be updated over time based on the continual learning NN. An administrator, developer, or the like may further provide inputs and/or annotations to training data, as well as rebalancing of nodes with the NN in order to prevent the continual learning NN from "forgetting" older data, which may occur when additional new data is processed and used to train the NN. Further, by utilizing a continual learning NN, updates and/or changes to the primary AI system may be integrated with the fallback AI system based on new context data and corresponding output decisions that are caused by the updates to the primary AI system.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110 and a service provider server 120 in communication over a network 140. Client device 110 may be utilized by a user to request operations that require predictive analysis, recommendations, and other AI outputs based on user inputs and requests. Service provider server 120 may provide various data, operations, and other functions to the user, including providing a production computing environment that includes one or more primary or production AI models and systems for AI predictive operations (e.g., risk analysis during electronic transaction processing, marketing recommendations or strategies, and the like). Based on the input context data from client device 110 and/or other computing devices and users, output decisions may be made by classifications of the AI system. The input/output data may be monitored and used to train a fallback AI system, as well as build microservices within the production computing environment or other computing environments.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a computing or communication device that may utilize appropriate hardware and software configured for wired and/or wireless communication with service provider server 120, which may include personal and mobile computing devices of individual and/or groups of users of service provider server 120, such as single users, merchants, and/or other entities. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one client device is shown, a plurality of client devices may function similarly.

Client device 110 of FIG. 1 contains a service application 112, other applications 114, a database 116, and a network interface component 118. Service application 112 and other applications 114 may correspond to executable processes, procedures, and/or applications with associated hardware. In other embodiments, client device 110 may include additional or different modules having specialized hardware and/or software as required.

Service application 112 may correspond to one or more processes to execute modules and associated components of client device 110 to interact with a service provider or other online entity that may provide AI services through AI systems and trained AI models, such as service provider server 120. In this regard, service application 112 may correspond to specialized hardware and/or software utilized by client device 110 to establish an account and utilize the account with AI services, which may include electronic transaction processing, messaging, electronic communications and email, social networking, search engines and search systems, advertisements and marketing, chatbots, risk analysis, credit extension, fraud assessments, and other services that may utilize AI systems.

Service application 112 may be used to establish, access, and maintain an account, such as by providing user personal and/or financial information, setting authentication information, queries, and challenges, and maintaining the account by providing other necessary information for account usage and/or verification. In this regard, with a transaction processor system, service application 112 may be used, during electronic transaction processing, to utilize user financial information, such as credit card data, bank account data, or other funding source data, as a payment instrument when providing payment information, including an account for electronic transaction processing of a transaction. For example, service application 112 may utilize a digital wallet associated with the account as the payment instrument, for example, through accessing a digital wallet or account of a user through entry of authentication credentials and/or by providing a data token that allows for processing using the account. Service application 112 may also be used to receive a receipt or other information based on transaction processing. However, in other embodiments, different services may also be provided through the account and/or service provider, including the aforementioned services that may utilize AI systems for intelligent decision-making Service application 112 may correspond to a general browser application configured to retrieve, present, and communicate information over the Internet (e.g., utilize resources on the World Wide Web) or a private network. For example, service application 112 may provide a web browser, which may send and receive information over network 140, including retrieving website information, presenting the website information to the user, and/or communicating information to the website. However, in other embodiments, service application 112 may include a dedicated application of service provider server 120 or other entity (e.g., payment provider, etc.), which may be configured to provide services through the application. Service application 112 may therefore be used to utilize an account and/or service provider services provided by service provider server 120. In this regard, while utilizing an account and/or service provider services, one or more inputs may cause an output decision by the trained AI model of the AI system. This data may be used to train a fallback AI model and system for redundancy during system failover and failover conditions, as further discussed herein. Thus, in some embodiments, service application 112 may request AI decision-making by fallback AI systems and models during a system failover.

In various embodiments, client device 110 also includes other applications 114 as may be desired in particular embodiments to provide features to client device 110. For example, other applications 114 may include security applications for implementing client-side security features, programmatic client applications for interfacing with appropriate application programming interfaces (APIs) over network 140, or other types of applications. Other applications 114 may also include additional communication applications, such as email, texting, voice, social networking, and IM applications that allow a user to send and receive emails, calls, texts, and other notifications through network 140. Other applications 114 may be utilized with service application 112 to utilize an account and/or service, as well as provide device and/or user data to service provider server 120 that may be used during AI decision-making. Other applications 114 may include device interfaces and other display modules that may receive input and/or output information. For example, other applications 114 may contain software programs, executable by a processor, including a graphical user interface (GUI) configured to provide an interface to the user.

Client device 110 may further include database 116 stored in a transitory and/or non-transitory memory of client device 110, which may store various applications and data and be utilized during execution of various modules of client device 110. Thus, database 116 may include, for example, identifiers (IDs) such as operating system registry entries, cookies associated with voice data application 120 and/or other applications 114, IDs associated with hardware of client device 110, or other appropriate IDs, such as IDs used for payment account/user/device authentication or identification. Database 116 may further include input and/or output data by an AI system when required to be stored by client device 110.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Client device 110 may also communicate directly with nearby devices using short range communications, such as Bluetooth Low Energy, LIE Direct, Wi-Fi, radio frequency, infrared, Bluetooth, and near field communications.

Service provider server 120 may be maintained, for example, by an online service provider, which may provide AI systems and operations, including fallback AI systems for a primary production AI system to utilize during instances of AI system failure and failover conditions. In this regard, service provider server 120 includes one or more processing applications which may be configured to interact with AI systems to build these simulated AI models and utilize the models for a fallback AI system. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes an AI service application 130, a transaction processing application 122, a database 124, and a network interface component 128. AI service application 130 and transaction processing application 122 may correspond to executable processes, procedures, and/or applications with associated hardware. In other embodiments, service provider server 120 may include additional or different modules having specialized hardware and/or software as required.

AI service application 130 may provide AI services through a production AI system 132 and fallback AI system 134, which may utilize one or more software processes and/or hardware of service provider server 120. In this regard, AI service application 130 may correspond to specialized hardware and/or software used by service provider server 120 to first train, establish, and/or integrate different AI platforms, such as a production AI system 132 that may run one or more primary AI services in a production computing environment. Thus, production AI system 132 may serve as a primary AI system for a production computing environment. AI service application 130 may also include multiple different AI platforms through different connections, data calls, and interactions between different AI products or services (e.g., a risk analysis AI system, a marketplace recommendation AI system, an advertisement AI system, a search engine AI system, or an automated chatbot AI system). AI service application 130 further uses a fallback AI system 134 to provide redundancy and AI decision-making during a failure of production AI system 132 and a failover condition. Thus, AI service application 130 may include multiple different AI functionalities based on trained AI models from AI data, training data, and/or AI models input/output pairs.

For example, AI service application 130 may provide or interact with a production computing environment, including an electronic transaction processing computing environment that provides processing of digital transactions. In this regard, AI service application 130 may provide risk assessment and fraud prevention AI models and systems trained to detect potential fraud, as well as other AI services for a marketplace recommendation AI system, an advertisement AI system, a search engine AI system, or an automated chatbot AI system. This may be provided through production AI system 132, which may be monitored by a monitoring operation and process to generate training data for fallback AI system 134. AI service application 130 may therefore include a monitoring operation to detect, record, log, and store input data and output decisions, classifications, or values, such as input user interactions and output AI decisions. For example, a user interaction may correspond to some user input or request from client device 110 or another device during electronic transaction processing (e.g., username, account number, transaction information, geo-location, etc.) or another use of a service, where an output decision may correspond to an output by production AI system 132 in response to the input.

Thus, the user interactions may correspond to an input/output set for an AI prediction, recommendation, and/or predictive operation. Using this monitored data of input/output pairs by production AI system 132, AI service application 130 may generate training data for fallback AI system 134 that is trained using the training data and AI trainer 136. Fallback AI system 134 may therefore correspond to one or more simulated or mimicked AI models built to process the same or similar inputs and provide the same or similar outputs as production AI system 132. For example, fallback AI system 134 may correspond to machine learning or neural network models built and trained using the monitored input/output pairs for production AI system 132. Fallback AI system 134 may be trained using a continual learning NN technique and/or algorithm provided by AI trainer 136.

For example, fallback AI system 134 may be generated by AI trainer 136 based on training data from monitoring the inputs and outputs of production AI system 132. When building fallback AI system 134 by AI trainer 136, the training data may be used to generate one or more classifiers and provide recommendations, predictions, or other outputs based on those classifications and an AI model. For example, fallback AI system 134 may include one or more layers, including an input layer, a hidden layer, and an output layer having one or more nodes; however, different layers may also be utilized. For example, as many hidden layers as necessary or appropriate may be utilized. Each node within a layer is connected to a node within an adjacent layer, where a set of input values may be used to generate one or more output values or classifications. Within the input layer, each node may correspond to a distinct attribute or input data type that is used to train fallback AI system 134 by AI trainer 136, such as using a continual learning NN.

Thereafter, the hidden layer may be trained with these attributes and corresponding weights using an AI algorithm, computation, and/or technique. For example, each of the nodes in the hidden layer generates a representation, which may include a mathematical AI computation (or algorithm) that produces a value based on the input values of the input nodes. The AI algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for fallback AI system 134 that attempt to simulate the corresponding output values of production AI system 132. Thus, when fallback AI system 134 are used to perform a predictive analysis and output corresponding to production AI system 132, fallback AI system 134 may attempt to simulate and mimic the results of production AI system 132 and corresponding outputs based on training data from monitoring production AI system 132.

Thus, fallback AI system 134 may be trained by using training data corresponding to the monitored input/output pairs from production AI system 132. Training may also include adjusting, such as when a node, connection, and/or layer may be initially trained and later adjusted. Thus, training may include adjusting and vice versa. By providing training data to AI service application 130 to train fallback AI system 134, the nodes in the hidden layer may be trained (adjusted) such that an optimal output (e.g., a classification) is produced in the output layer based on the training data. By continuously providing different sets of training data and penalizing fallback AI system 134 when the output of fallback AI system 134 is incorrect, fallback AI system 134 (and specifically, the representations of the nodes in the hidden layer) may be trained (adjusted) to improve its performance in data classification. Adjusting fallback AI system 134 may include adjusting the weights associated with each node in the hidden layer.

Once fallback AI system 134 has been generated and trained to the extent desired for providing outputs within thresholds of the production AI system 132, AI service application 130 may provide fallback AI services during downtime, failure, or other operations that cause production AI system 132 to become offline, for example, when a failover condition occurs with production AI system 132. Fallback AI system 134 may be provisioned to be a fallback during a failover. Thus, AI service application 132 may detect a failover condition or state that occurs where production AI system 132 becomes unavailable for AI services in the production computing environment. For example, a timeout may occur due to an error in data processing or a computing attack, other malicious actions may cause production AI system 132 to fail, or other issues in the production computing environment and/or production AI system 132 may cause the failover to fallback AI system 134.

Thereafter, AI service application 130 may then switch or transition from production AI system 132 to fallback AI system 134 during the failover after provision fallback AI system 134 for use during failure of production AI system 132. This may be done using the same API contract for the APIs used by production AI system 132 and/or the production computing environment to communicate with client device 110 and/or other computing devices and servers. The API contract may describe the particular operations, protocols, connections, and/or code utilized for interactions between different APIs. For example, the API contract may determine the structure and design of one or more APIs used to communicate with client device 110 so that transitioning of production AI system 132 to fallback AI system 134 may be done seamlessly through APIs determined for fallback AI system 134 using the agreed upon API contract. Once transitioning occurs, fallback AI system 134 may be utilized until production AI system 132 is again available.

During use of fallback AI system 134, one or more policy rules and/or a light policy layer may be implemented with fallback AI system 134 to prevent fraud or abuse of a system that may not include as many rules, AI models, and the like for risk assessment and fraud detection. For example, the policy rules may prevent certain transactions and transaction processing to prevent abuse until production AI system 132 is capable of handling such transactions. Further, fallback AI system 134 may be continuously trained using a continual learning NN with additional input/output pairs from production AI system 132 so that updates and changes to AI models within production AI system 132 may be included within fallback AI system 134. This may be performed in an unsupervised manner to reduce human intervention and cost in providing fallback AI system 134. Supervised training may also be used and/or rules may be established with certain training data and/or classifications in order to prevent loss of past training and/or minimization in risk analysis.

Transaction processing application 122 may correspond to one or more processes to execute modules and associated specialized hardware of service provider server 120 to process a transaction, which may be used to process payments, for example, through the use of AI services of AI service application 120. In this regard, transaction processing application 122 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account and provide payments through the payment account. The payment account may be accessed and/or used through a browser application and/or dedicated payment application, which may include AI functionalities provided by AI service application 120. This may include risk analysis through AI decision-making by production AI system 132 and/or fallback AI system 134. Transaction processing application 122 may process the payment and may provide a transaction history for transaction authorization, approval, or denial.

Additionally, service provider server 120 includes database 124. Database 124 may store various identifiers associated with first AI platform 110 and second AI platform 120. Database 124 may also store account data, including payment instruments and authentication credentials, as well as transaction processing histories and data for processed transactions. Database 124 may store financial information and tokenization data, as well as transactions, transaction results, and other data generated and stored by transaction processing application 122. Additionally, data generated by AI service application 130 may be stored by database 124, such as training data 126 for input/output pairs of decisions performed by production AI system 132, which may be used by AI trainer 136 to generate fallback AI system 134.

In various embodiments, service provider server 120 includes at least one network interface component 128 adapted to communicate with client device 110 over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
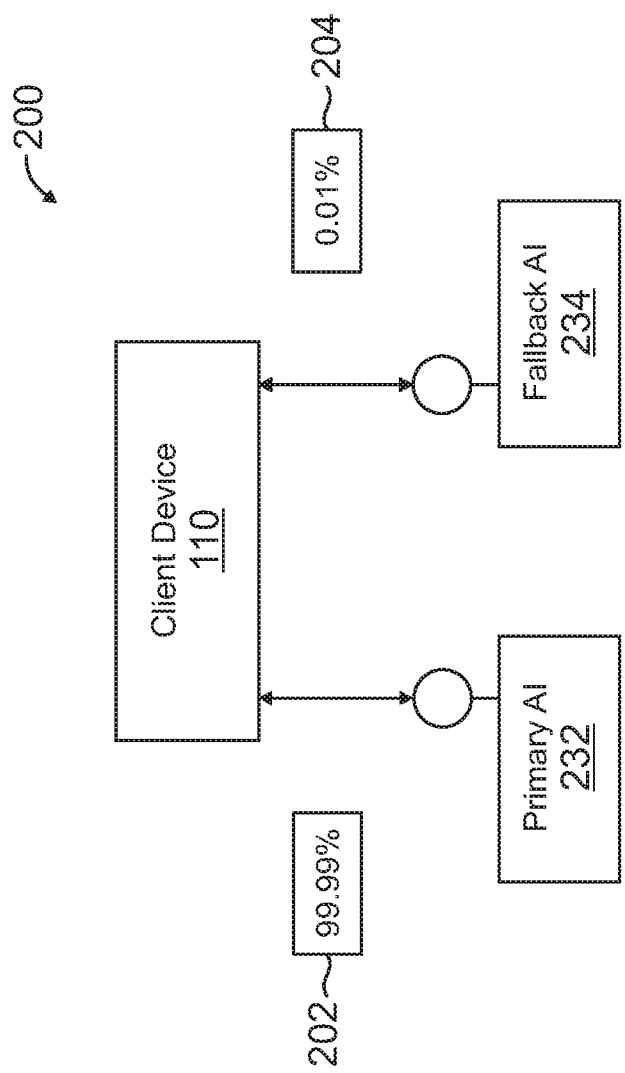
FIG. 2 is an exemplary block diagram of a fallback artificial intelligence (AI) system that provides redundancy to a primary AI system, according to an embodiment.

FIG. 2 is an exemplary block diagram 200 of a fallback AI system that provides redundancy to a primary AI system, according to an embodiment. Diagram 200 of FIG. 2 includes client device 110 discussed in reference to system 100 of FIG. 1. In this regard, diagram 200 displays client device 110 interacting with a primary AI system 232 and a fallback AI system 234 to provide AI operations during standard computing conditions and failover computing conditions.

In this regard, client device 110 may initially interact with primary AI system 232 for AI decision-making operations, such as intelligent risk analysis by an AI system based on trained AI models to detect risk during electronic transaction processing. Primary AI system 232 may correspond to production AI system 132 in system 100, where primary AI system 232 is trained using one or more AI algorithms to have one or more primary AI models used in a production computing environment to provide AI decisions based on input data. This may occur in a majority scenario 202 for AI decision-making, such as a 99.99% occurrence. However, since primary AI system 232 may provide important decision-making services, if primary AI system 232 fails, computing attacks, fraud, or other malicious actions may be performed and/or risk compromising a system. For example, primary AI system 232 may be required to be consistently available in order to provide risk assessments to determine whether a transaction may proceed. If a timeout or failure occurs within primary AI system 232, fraud may be perpetrated on an electronic transaction processing system, which may allow fraudulent transactions to proceed and cause risk and loss to the corresponding online transaction processor.

Thus, in order to prevent a failure of primary AI system 232 from compromising a system, during a failover condition or state, the online transaction processor may cause fallback AI system 234 (that has been provisioned for AI decision-making when primary AI system 232 fails) to go online and make real-time decisions for live transactions. Instead of using policy rules and layers, which may be rigid and therefore open to exploitation, fallback AI system 234 may instead be trained on input data and output decisions previously monitored from primary AI system 232. Fallback AI system 234 may be trained using a NN, such as a continual learning NN, that may utilize production input/output data pairs from primary AI system 232, so that a simulated AI model may make similar decisions to the AI models of primary AI system 232. Moreover, fallback AI system 234 may be continually trained until the decision-making accuracy of fallback AI system 234 exceeds an accuracy goal or threshold, so that fallback AI system 234 makes the same or similar decision to primary AI system 232 in a satisfactory number of cases or input requests. In this regard, fallback AI system 234 may be provisioned once decision-making satisfies a certain accuracy (e.g., 70% or higher accuracy), so that in a minority scenario 204, such as 0.01% occurrence when primary AI 232 system fails, fallback AI system 234 may be trusted to perform sufficiently capable decision-making on behalf of primary AI system 232.

Figure 3:
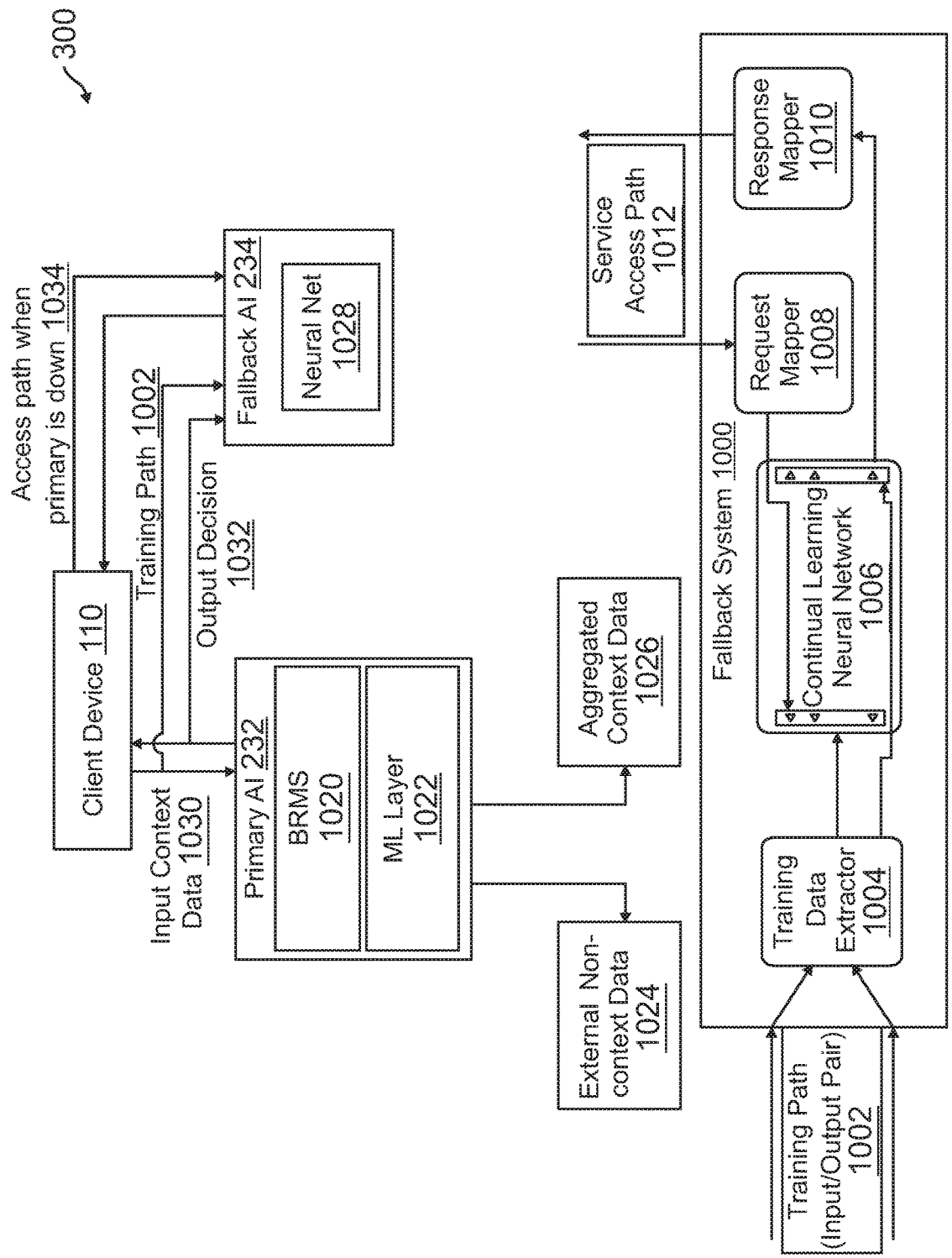
FIG. 3 is an exemplary environment displaying training of a fallback AI system based on training data from a primary AI system, according to an embodiment.

FIG. 3 is an exemplary environment 300 displaying training of a fallback AI system based on training data from a primary AI system, according to an embodiment. Environment 300 includes operations and components implemented and executed by AI service application 130 of service provider server 120 discussed in reference to system 100 of FIG. 1. In this regard, AI service application 130 may operate within environment 300 to interact with primary AI system 232 in a production computing environment to generate and provision fallback AI system 234 further discussed in reference to system 100.

In environment 300, a fallback system 1000 is trained based on data from a training path 1002 occurring when a client device interacts with the AI decision-making service and system in environment 300. For example, training path 1002 is shown as providing an input/output pair to fallback system 1000. Training path 1002 may therefore include training data that is determined from input data and output decisions, recommendations, values, or other data by primary AI system 232. Thus, training path 1002 provides data to training data extractor 1004, which may perform data conversion and/or feature extraction of context data that is received from the input data and the output data from primary AI system 232. Training data extractor 1004 may therefore correspond to one or more operations to determine ML or NN features that may be utilized as input to a corresponding model utilized by primary AI system 232 and/or fallback AI system 234. This extracted feature data is then provided as input for training continual learning neural network (NN) 1006 of fallback system 1000. For example, training data extractor 1004 is shown as providing input features to train a NN with output values, classifications, recommendations, decisions, or the like. This includes any mappings of the input/output pairs from training data 1002, which may be used by continual learning NN 1006 for training fallback AI system 234 provided by fallback system 1000. The input/output pairs may correlate generally to input data, such as input transaction data, user data, authentication data, and the like, with corresponding output decisions by the trained AI model (e.g., risk decisions, login allowance or refusal, identification decisions, and the like).

In order to map features to corresponding desired output, a request mapper 1008 and a response mapper 1010 may interact with a service access path 1012 to perform AI decision-making based on input data in a request to fallback AI system 234. For example, a request having input data for fallback AI system 234 may be provided to fallback AI system 234, where service access path 1012 provides the request and input data to request mapper 1008. Request mapper 1008 then processes the input data with continual learning NN 1006, which provides a corresponding output decision to response mapper 1010. Therefore, request mapper 1008 and response mapper 1010 interact to map input data to output data for continual learning NN 1006. Response mapper 1010 may then interact with service access path 1012 to provide the output data for an AI decision by fallback AI system 234 to client device 110 and/or during the use of a production computing system and operations that utilize fallback AI system 234 for AI decision-making during failure of primary AI system 232.

In an exemplary embodiment within environment 300, client device 110 may request use of primary AI system 232 and/or be utilizing services provided by primary AI system 232, for example, when utilizing electronic transaction processing services in a production computing environment. Primary AI system 232 is shown having a business rules management system 1020, which may include business rules and policy layers that manage, define, and maintain logic for different operational systems of a service provider, such as an online transaction processor. Further primary AI system 232 includes a ML layer 1022, which may correspond to one or more trained ML or NN models used for automated decision-making. In this regard, primary AI system 232 has access to one or more data stores, including external non-context data and aggregated context data 1026, which may be used in AI model training and/or decision-making by ML layer 1022. Further, during a failover condition or state, failover may occur to fallback AI system 234 having a NN 1028 corresponding to the trained NN or other AI model and system provided by fallback system 1000.

Thus, when client device 110 provides input context data 1030, that input context data 1030 is provided to primary AI system 232 for decision-making. Thereafter, an output decision 1032 is provided with input context data 1030 through training path 1002, which may be provided to fallback AI system 234 as training path 1002 for use with training data extractor 1004 for fallback system 1000's training. Thus, the input/output pair from input context data 1030 and output decision 1032 is shown as providing the training data used with training path 1002 for training of fallback AI system 234 while primary AI system 232 is online or available. Further, primary AI system 232 may return output decision 1032 to client device 110 and/or in the use of services requested by client device 110. However, in different embodiments where primary AI system 232 is down, has timed out, or has failed, instead input context data 1030 may be rerouted to fallback AI system 234 through a failover access path 1034, which may request decision-making from fallback AI system 234 during the failover condition. Thereafter, failover access path 1034 may interact with service access path 1012 to request a decision through request mapper 1008 and receive the decision through response mapper 1010.

Figure 4:
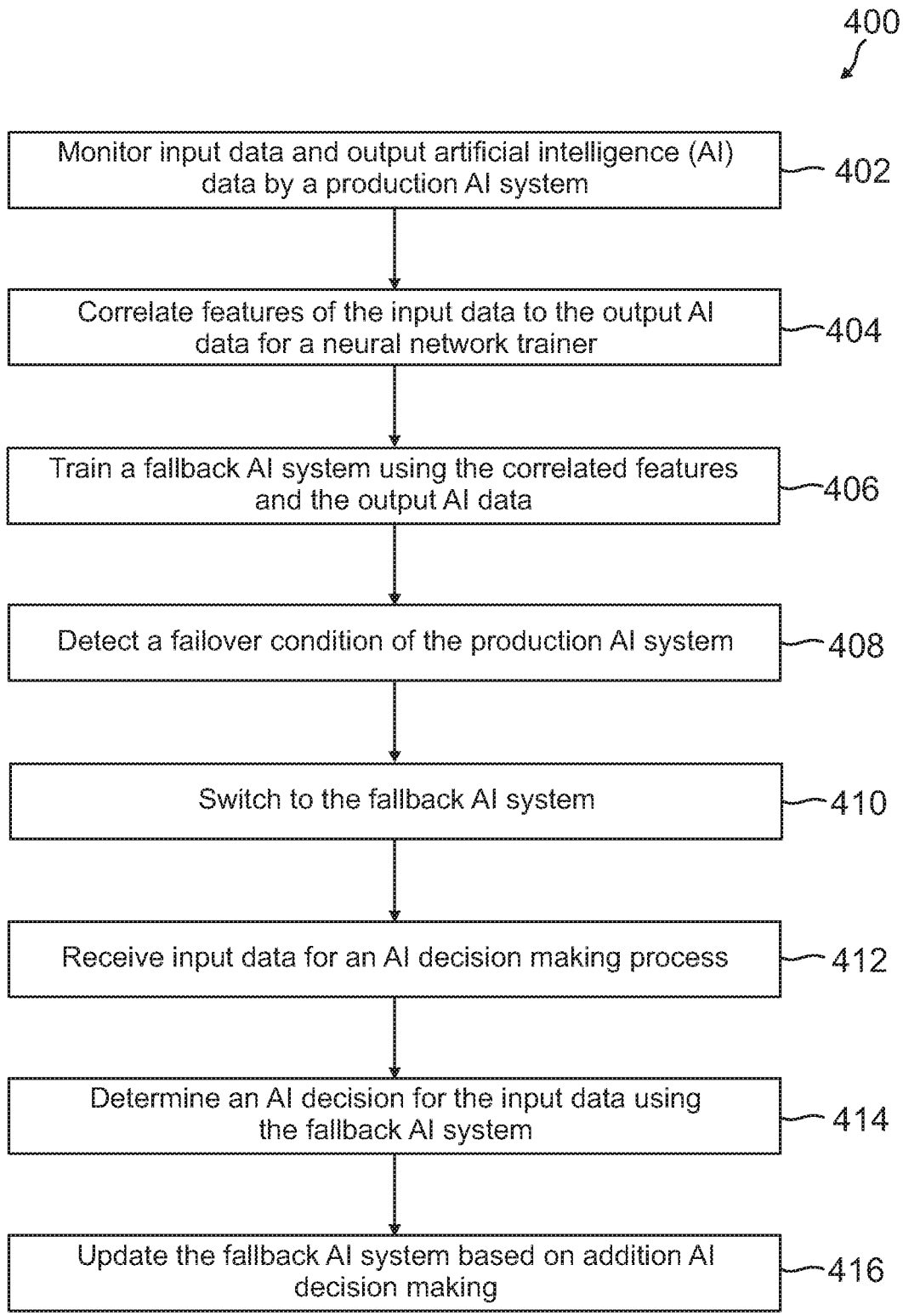
FIG. 4 is a flowchart for a fallback AI system for redundancy during system failover, according to an embodiment.

FIG. 4 is a flowchart for a fallback artificial intelligence (AI) system for redundancy during system failover, according to an embodiment. Note that one or more steps, processes, and methods described herein of flowchart 400 may be omitted, performed in a different sequence, or combined as desired or appropriate.

At step 402 of flowchart 400, input data and output AI data by a production AI system is monitored. This may include monitoring input/output pairs by a primary AI system that is utilized in a production computing environment or generally for the majority of decision-making for particular AI operations and processes of a service provider. The AI monitoring operations may include determining input requests and/or user interactions with an AI system, and then determining the corresponding decisions, recommendations, values or scores, and/or other outputs. Thereafter, at step 404, features of the input data are correlated to the output AI data for a neural network (NN) trainer. For example, feature extraction and/or other conversion of data required to perform AI (e.g., ML or NN) model training may be performed so that the input/output data may be processed by the NN trainer. The NN trainer may correspond to a continual learning NN that may continually train on the input/output data pairs from the production computing environment.

A fallback AI system is then trained using the correlated features and the output AI data, at step 406. The fallback AI system may correspond to a NN model trained using training data features and output decisions from the production AI system. The fallback AI system may be trained using the input/output pairs in order to mimic or simulate the decision-making of the production AI system. In this regard, a training pipeline or path may be used to continually train the NN model of the fallback AI system to perform decision-making. Once the fallback AI system is trained, the fallback AI system may be provisioned using the same API contract as the production AI system to perform AI decision-making through one or more APIs based on the API contract. Further, the fallback AI system may be tested prior to provisioning as a fallback AI system in order to determine an accuracy in decision-making as compared to the production AI system. In this regard, the fallback AI system may be required to meet or exceed a percentage correct or similar decision-making or other threshold score or value in order to be utilized as a fallback AI system (e.g., 70% accuracy in decision-making after training). In order to prevent abuse of the fallback AI system, a policy layer having one or more business and/or policy rules may be implemented that may limit services provided during use of the fallback AI system.

Thereafter, a failover condition of the production AI system is detected, at step 408. The failover condition may occur due to a timeout of the production AI system, such as when a risk model or variable of the production AI system is unresponsive, unable to process data, or otherwise unavailable or malfunctioning, such as outputting incorrect data. The failover condition may therefore cause a failover to the production AI system, where at step 410, the service provider switches to the fallback AI system for AI decision-making. When switching, APIs built using the same API contract of the production AI system may be utilized in order to provide seamless transitioning and communication with one or more systems, client devices, and/or servers.

At step 412, input data for an AI decision-making process is received. The input data may correspond to a request for decision-making by a system or a client device during use of a service. For example, a user may request electronic transaction processing, however, production AI system may be offline or unavailable. The service provider therefore has transitioned to the fallback AI system for decision-making, including risk analysis for the electronic transaction processing. Thus, the input data may include some information for analysis, such as a username, geo-location, IP address, account identifier, sender/recipient information, transaction information, and the like.

At step 414, an AI decision for the input data is determined using the fallback AI system. The AI decision may correspond to an output decision by the fallback AI system that attempts to simulate the decision that would be made by the production AI system. Thus, the output decision may be made based on the training data from the production AI system. This allows the service provider to have redundancy to AI systems during failover. Further, the fallback AI system may be updated based on additional AI decision-making, such as additional input/output pairs by the production AI system, at step 416. This may be used with a continual learning NN algorithm and technique so that any changes to the AI models used by the production AI system are also used or by the fallback AI system. For example, over time, the production AI system may be further updated and changed, such as when new AI models are deployed, AI models are updated and/or retrained, and the like. Thus, by using continual learning NN models and techniques, these updates may be reflected in the fallback AI system. In some embodiments, additional annotations for decision-making processes (e.g., correct or incorrect) may be used to further optimize the fallback AI system.

Figure 5:
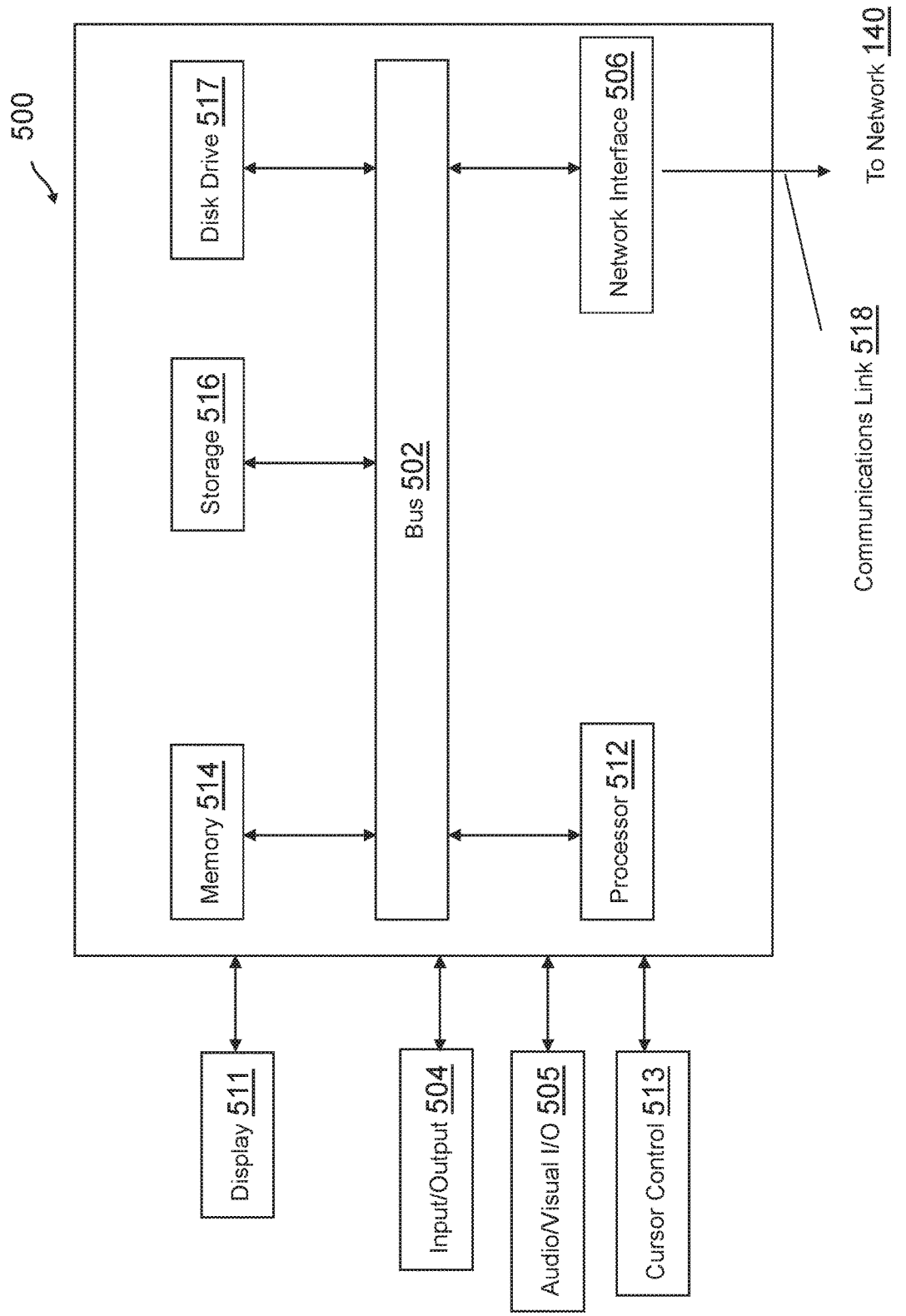
FIG. 5 is a block diagram of a computer system suitable for implementing one or more components in FIGS. 1-3, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims

What is claimed is:

1. A system comprising:
   a non-transitory memory; and
   one or more hardware processors coupled to the non-transitory memory and configured to read instructions from the non-transitory memory to cause the system to perform operations comprising:
   monitoring, via a training data path, a production artificial intelligence (AI) system for input data and output decisions by the production AI system based on the input data;
   determining, using a training data extractor associated with the training data path, mapped data pairs of the input data to the output decisions of the production AI system prior to processing the input data and the output decisions by an AI training operation for a secondary AI system;
   training, using the AI training operation, the secondary AI system for the production AI system based on the mapped data pairs, wherein the AI training operation comprises a neural network training technique to train the secondary AI system based on the mapped data pairs of the production AI system;
   testing the secondary AI system using testing data from the production AI system, wherein the testing comprises:
      producing a plurality of output test decisions by the secondary AI system based on inputting the testing data to the secondary AI system, and
      comparing the plurality of output test decisions by the secondary AI system to decision-making results by the production AI system from the testing data;
   determining, based on the testing the secondary AI system, that the secondary AI system meets a decision-making accuracy of the decision-making results by the production AI system; and
   provisioning, based on the determining that the secondary AI system meets the decision-making accuracy, the secondary AI system with the production AI system during a failover state of the production AI for data communication with one or more client devices connected to the system.

2. The system of claim 1, wherein the operations further comprise:
   receiving additional input data from the one or more client devices based on a data processing request by the one or more client devices with the system, wherein the additional input data is received during the failover state of the production AI system;
   in response to the receiving, during the failover state the additional input data during the failover state of the production AI system, routing additional input data of the one or more client devices from the production AI system to the secondary AI system;
   determining at least one additional output decision by the secondary AI system based on the additional input data; and
   utilizing the at least one additional output decision with the data processing request by the one or more client devices.

3. The system of claim 2, wherein prior to the receiving the additional input data, the operations further comprise:
   detecting the failover state of the production AI system; and
   transitioning from the production AI system to the secondary AI system during the failover state using an API for the secondary AI system that is associated with an API contract designated for the data communication with the one or more client devices, wherein the transitioning uses the secondary AI system for AI decision-making by the system during the failover state.

4. The system of claim 1, wherein the secondary AI system comprises one of a fallback risk analysis AI system for the production AI system or a microservice AI system for a microservice provided by the production AI system.

5. The system of claim 1, wherein prior to the mapping, the operations further comprise:
  performing a feature extraction of the input data; and
  determining, based on the performing the feature extraction, an input feature to train the secondary AI system using the neural network training technique,
    wherein the training the secondary AI system uses the input feature.

6. The system of claim 5, wherein prior to the mapping, the operations further comprise:
  determining a classifier for the production AI system based on the output decisions,
    wherein the training the secondary AI system uses the classifier.

7. The system of claim 6, wherein the determining the input feature comprises determining a plurality of input features including the input feature, and wherein the determining the classifier comprises determining a plurality of classifiers including the classifier.

8. The system of claim 1, wherein the provisioning the secondary AI system comprises:
  determining at least one API based on an API contract of the production AI system with the one or more client devices; and
  utilizing the at least one API for the secondary AI system.

9. The system of claim 1, wherein the secondary AI system comprises at least one policy rule associated with fraud prevention using the secondary AI system, and wherein the decision-making accuracy is set by the at least one policy rule coded for the decision-making by the production AI system.

10. The system of claim 1, wherein the monitoring occurs over a time period based on a continuously learning neural network operation for the neural network training technique.

11. The system of claim 1, wherein the production AI system comprises one of a risk analysis AI system, a marketplace recommendation AI system, an advertisement AI system, a search engine AI system, or an automated chatbot AI system.

12. A method comprising:
  monitoring, via a deep neural network training process, first interactions with a first artificial intelligence (AI) model for risk analysis in a production computing environment, wherein the first interactions comprise input transaction data for the risk analysis and output risk data by the first AI model based on the input transaction data;
  determining, via the deep neural network training process, a second AI model for the first AI model based on the first interactions, wherein the second AI model simulates the output risk data by the first AI model based on the input transaction data;
  testing the second AI model using testing data from the first AI model, wherein the testing comprises:
    producing a plurality of output test decisions by the second AI model based on inputting the testing data to the second AI model, and
    comparing the plurality of output test decisions by the second AI model to decision-making results by the first AI model from the testing data;
  determining, based on the testing the second AI model, that the second AI model meets a decision-making accuracy of the decision-making results by the first AI model;
  detecting a failure of the first AI model for the risk analysis in the production computing environment;
  receiving transaction processing data for the risk analysis in the production computing environment; and
  requesting the risk analysis from the second AI model based on the transaction processing data.

13. The method of claim 12, wherein prior to the determining the second AI model, the method further comprises:
  determining, via the deep neural network training process, input features of the first interactions,
    wherein the determining the second AI model uses the input features.

14. The method of claim 13, wherein the determining the input features comprises determining training data comprising the input features and classifiers based on output risk data by the first AI model.

15. The method of claim 12, wherein the deep neural network training process comprises an unsupervised learning algorithm.

16. The method of claim 12, wherein the deep neural network training process comprises a continuous learning deep neural network.

17. The method of claim 12, wherein the determining the second AI model comprises implementing a policy layer for the second AI model comprising at least one processing rule associated with electronic transaction processing in the production computing environment.

18. The method of claim 17, wherein the at least one processing rule is associated with a maximum transaction processing limit for the electronic transaction processing when using the second AI model for risk analysis for the electronic transaction processing in the production computing environment.

19. The method of claim 12, wherein the second AI model further comprises at least one application programming interface (API) for interaction with client devices based on an API contract of the first AI model with the client devices by the production computing environment.

20. A non-transitory machine-readable medium having stored thereon machine-readable instructions executable to cause a machine to perform operations comprising:
  deploying, for a risk analysis artificial intelligence (AI) system for an electronic transaction processor, a fallback AI system, wherein the fallback AI system is trained using input transaction data and output risk decisions for electronic transactions processed by the electronic transaction processor and tested using testing data from the risk analysis AI system, wherein the fallback AI system is tested by:
    producing a plurality of output test decisions by the fallback AI system based on inputting the testing data to the fallback AI system,
    comparing the plurality of output test decisions by the fallback AI system to decision-making results by the risk analysis AI system from the testing data, and
    determining that the fallback AI system meets a decision-making accuracy of the decision-making results by the risk analysis AI system, wherein the decision-making accuracy is set by at least one coded rule for the decision-making by the risk analysis AI system;
  detecting a failover condition of the risk analysis (AI) system for the electronic transaction processor;
  determining the fallback AI system of the electronic transaction processor for the risk analysis AI system,
  utilizing the fallback AI system for the electronic transaction processor in place of the risk analysis AI system during the failover condition;

receiving an input transaction from a client device during the failover condition;
providing the input transaction to the fallback AI system instead of the risk analysis AI system during the failover condition;
processing at least a portion of data associated with the input transaction using the fallback AI system;
determining a risk assessment of the input transaction based on the processing the at least the portion of the data; and
utilizing the risk assessment for transaction approval or transaction declination of the input transaction.

* * * * *

UNITED STATES PATENT AND TRADEMARK OFFICE
CERTIFICATE OF CORRECTION

| | |
|---|---|
| PATENT NO. | : 11,568,253 B2 |
| APPLICATION NO. | : 16/990770 |
| DATED | : January 31, 2023 |
| INVENTOR(S) | : Joydeep Hazra et al. |

It is certified that error appears in the above-identified patent and that said Letters Patent is hereby corrected as shown below:

In the Claims

Claim 20, Column 20, Line 61, change "detecting a failover condition of the risk analysis (AI)" to --detecting a failover condition of the risk analysis AI--.

Claim 20, Column 20, Line 64, change "transaction processor for the risk analysis AI system," to --transaction processor for the risk analysis AI system;--.

Signed and Sealed this
Seventh Day of March, 2023

*Katherine Kelly Vidal*

Katherine Kelly Vidal
*Director of the United States Patent and Trademark Office*